United States Patent [19]

Euzen et al.

[11] Patent Number: 5,915,951
[45] Date of Patent: *Jun. 29, 1999

[54] PROCESS FOR CATALYTIC COMBUSTION OF A FUEL IN THE PRESENCE OF A NON-SELECTIVE OXIDATION CATALYST

[75] Inventors: Patrick Euzen, Rueil Malmaison; Eric Tocque, Chatou; Stephane Rebours, Rueil Malmaison; Gil Mabilon, Carrieres Sur Seine, all of France

[73] Assignee: Institut Francais du Petrole, France

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/770,771

[22] Filed: Dec. 20, 1996

[30] Foreign Application Priority Data

Dec. 22, 1995 [FR] France ................................... 95 15341

[51] Int. Cl.⁶ .................................................. B01D 53/94
[52] U.S. Cl. ...................... 431/7; 423/213.5; 423/213.7; 423/245.3; 423/247; 423/248
[58] Field of Search ..................... 502/302, 304, 502/263, 325, 326, 327, 340, 341, 349; 423/213.5, 213.7, 213.2, 245.3, 247, 248; 431/2, 7

[56] References Cited

U.S. PATENT DOCUMENTS

| | | | |
|---|---|---|---|
| 4,220,559 | 9/1980 | Polinski | 252/455 R |
| 4,294,726 | 10/1981 | Bozon et al. | 252/462 |
| 4,378,307 | 3/1983 | Brunelle et al. | 252/455 R |
| 4,788,174 | 11/1988 | Arai | 502/324 |
| 4,793,797 | 12/1988 | Kato et al. | 431/7 |
| 4,857,499 | 8/1989 | Ito et al. | 502/326 |
| 4,959,339 | 9/1990 | Arai | 502/302 |
| 5,073,532 | 12/1991 | Domesle et al. | 502/304 |
| 5,425,632 | 6/1995 | Kazumori | 431/7 |
| 5,643,543 | 7/1997 | Guibard et al. | 423/213.5 |
| 5,823,761 | 10/1998 | Euzen et al. | 431/7 |

FOREIGN PATENT DOCUMENTS

| | | |
|---|---|---|
| 0 027 069 B2 | 4/1981 | European Pat. Off. . |
| 0 125 565R3 | 11/1984 | European Pat. Off. . |
| 0 198 948 A2 | 10/1986 | European Pat. Off. . |
| 0 326 845A3 | 8/1989 | European Pat. Off. . |
| 0 441 173A1 | 8/1991 | European Pat. Off. . |
| 0 525 677A1 | 2/1993 | European Pat. Off. . |
| 0 665 048A1 | 8/1995 | European Pat. Off. . |
| 2 742 863 A1 | 6/1997 | France . |
| 4-197443 | 7/1992 | Japan . |
| 5-200294 | 8/1993 | Japan . |
| 92/09848 | 6/1992 | WIPO . |
| 92/09849 | 6/1992 | WIPO . |

OTHER PUBLICATIONS

Jones et al. "Combustion Catalytique et Gaz Natural" Revue Generale De Thermique (FR) vol. 28 No. 330–331 pp. 401–406 (Paris, France), Jun./Jul. 1989.

Reay "Catalytic Combustion: Current Status and Implications for Energy Efficiency . . . " Heat Recovery Systems & CHP vol. 13 No. 5 pp. 383–390 Pergamon Press Ltd. Great Britian, No Month 1993.

Beguin et al. "Stabilization of Alumina by Addition of Lanthanum" Applied Catalysis, 75, pp. 119–132 Amsterdam, No Month 1991.

Trimm "Thermal Stability of Catalyst Supports" Studies in Surface Science, vol. 68, pp. 29–50 Elsevier Science Publishers, Amsterdam, No Month 1991.

Primary Examiner—Gary P. Straub
Assistant Examiner—Timothy C Vanoy
Attorney, Agent, or Firm—Millen, White, Zelane & Branigan, P.C.

[57] ABSTRACT

Processes for the catalytic combustion of hydrocarbons, carbon monoxide, hydrogen, or mixtures thereof (processes with one or more catalytic stages) and processes of abating the pollution produced by the exhaust gases of vehicles that run on natural gas using a non-selective oxidation catalyst. The non-selective oxidation catalyst comprises a monolithic substrate, a porous support with a refractory inorganic oxide base and an active phase that consists of cerium, zirconium, iron, and at least one metal that is selected from the group that is formed by palladium and platinum is described; with the porous support content being between 200 and 400 g per liter of catalyst; with the cerium content being between 0.3 and 20% by weight relative to the porous support; with the zirconium content being between 0.3 and 20% by weight relative to the porous support; with the iron content being between 0.01 and 3.5% of iron by weight relative to the porous support; and with the palladium and/or platinum content being higher than 3 g per liter of catalyst.

26 Claims, No Drawings

PROCESS FOR CATALYTIC COMBUSTION OF A FUEL IN THE PRESENCE OF A NON-SELECTIVE OXIDATION CATALYST

This invention relates to a non-selective oxidation catalyst and its use in the catalytic combustion of hydrocarbons, carbon monoxide, hydrogen or mixtures thereof and in abating the pollution produced by the exhaust gases of motor vehicles that are powered by natural gas.

Conventional combustion, which is carried out in the presence of a flame and is usually used in the processes of combustion of hydrocarbons, such as methane, is a process that is difficult to control. It takes place in a range of well-defined air/hydrocarbon concentrations and, in addition to forming carbon dioxide and water, leads to the production of pollutants like carbon monoxide and nitrogen oxides.

Combustion is referred to as catalytic when it consists of oxidation of the fuel at the surface of the catalyst. It then leads to the same products and releases the same amount of energy as conventional combustion, but at a much lower temperature. Its main advantages, which result from the control of the combustion of a lean mixture outside of the range of inflammability, are the limitation of hot points at the source of $NO_x$ and the absence of risks of inflammation or explosion. Catalytic combustion therefore produces very few pollutants such as $NO_x$ and CO. It can also be mentioned that it leads to more compact devices and that it makes it possible to burn a very large variety of compounds.

As D. Reay describes them in particular in "Catalytic Combustion: Current Status and Implications for Energy Efficiency in the Process Industries, Heat Recovery Systems & CHP, 13 No. 5, pp. 383–390, 1993" and as D. Jones and S. salfati describe them in "Rev. Gén. Therm. Fr. No. 330–331, pp. 4101–4106, June–July 1989," the applications of catalytic combustion are many: radiant panels and pipes, catalytic hot plates, gas turbines, cogeneration, burners, catalytic sleeves for steam reforming pipes, production of hot gases in the range of heating by direct contact, and reactors with catalytic plates. Because of the steady tightening of the standards on the $NO_x$ emitted by combustion processes, the catalytic combustion chamber can advantageously replace conventional burners, which cause high $NO_x$ contents. The conditions of operation—a highly oxidizing environment—of a catalytic combustion chamber are very far from applications of automobile post-combustion: treating the exhaust gases of gasoline vehicles that operate at richness 1 with a high $NO_x$ content and treating the exhaust gases of diesel vehicles with a high content of particles and $NO_x$. These major differences mean that dedicated combustion catalyst formulations must be sought.

Combustion catalysts are generally prepared from a monolithic substrate, made of ceramic or metal, on which is deposited a fine support layer that consists of one or more refractory oxides with a surface area and pores that are larger than those of the monolithic substrate. The active phase, which consists primarily of metals from the platinum group, is dispersed on this oxide.

Thermal stability, catalytic activity at low temperature, and the stability of the catalytic activity generally constitute the three main selection criteria for the catalyst.

There are combustion catalysts that are more resistant at high temperature. In certain combustion processes, the catalysts can be subjected to very high temperatures that often exceed 1000° C. When they are used at these high temperatures, however, it appears that the catalysts undergo degradation which reduces their catalytic performance levels. The sintering of the support as well as the sintering of the active phase and/or its encapsulation by the support are among the factors most commonly cited to explain this degradation. In the case of such catalysts operating at high temperature, thermal resistance can become the predominant criterion to the detriment of catalytic activity. The supports of these catalysts generally have an alumina base. It is known to one skilled in the art that it is possible to stabilize effectively the drop in specific surface area by a suitable dopant. The rare earths and silica are often cited among the highest-performing stabilizers of alumina. The catalysts that are prepared by this technique are described in, among others, U.S. Pat. No. 4,220,559. In this document, the catalyst comprises metals from the group of platinum or transition metals that are deposited on the alumina, an oxide of a metal that is selected from the group that consists of barium, lanthanum and strontium, and an oxide of a metal that is selected from the group that consists of tin, silicon, zirconium and molybdenum.

Further, to limit the sintering of the active metallic phase, it has been proposed that various stabilizers with a base primarily of transition metal oxides be added.

Thus, in U.S. Pat. No. 4,857,499, the catalyst comprises a porous support whose pore diameter is between 150 and 300 Å and whose proportion by weight relative to the substrate is preferably between 50 and 200 g/l, with an active phase including at least 10% by weight, relative to the porous support, of a precious metal that is selected from the group that is formed by palladium and platinum; with a first promoter including at least one element that is selected from the group that consists of lanthanum, cerium, praseodymium, neodymium, barium, strontium, calcium and their oxides whose proportion by weight relative to the porous support is between 5 and 20%; with a second promoter including at least one element that is selected from the group that is formed by magnesium, silicon and their oxides whose proportion by weight relative to the active phase is less than or equal to 10%, and a third promoter that includes at least one element that is selected from the group that consists of nickel, zirconium, cobalt, iron and manganese and their oxides whose proportion by weight relative to the active phase is less than or equal to 10%. Said catalyst also can be deposited on a monolithic substrate that belongs to the group that is formed by cordierite, mullite, alumina-α, zirconium and titanium oxide; with the proportion by weight of porous support relative to the volume of substrate being between 50 and 200 g/l.

In U.S. Pat. No. 4,793,797, the catalyst comprises an inorganic support that is selected from the group that consists of the oxides, carbides and nitrides of elements that belong to groups IIa, IIIa and IV of the periodic table or is selected from the group that consists of La—β—$Al_2O_3$, Nd—β—$Al_2O_3$, Ce—β—$Al_2O_3$ or Pr—β—$Al_2O_3$ at least one precious metal that is selected from the group that consists of palladium, platinum, rhodium and ruthenium, and at least one oxide of a metal with a base that is selected from the group that consists of magnesium, manganese, cobalt, nickel, strontium, niobium, zinc, tin, chromium and zirconium, such that the atomic ratio of the base metal to the precious metal is between 0.1 and 10.

Some of these catalysts exhibit greater durability than the active metallic phase itself. The dopants that are used, however, are suitable for conditions of very severe temperatures which can exceed 1000° C. They do not make it possible to limit effectively the degradation of the performance levels of the catalyst that occur at moderate temperatures, which can have various causes that are different from those that are responsible for the degradation at high temperatures.

It has also been proposed that several different catalysts be juxtaposed in a catalytic-stage reactor; with the first catalysts being more specifically dedicated to initiating the combustion reaction and the following ones being used to stabilize the combustion reaction at high temperature, and with the number of catalytic stages (or zones) being adjusted in accordance with the conditions imposed by the application in question. Thus, the following systems are known:

First catalytic zone: Pd and Pt and Nio; and second catalytic zone: Pt and Pd; for example, as described in European Patent Application EP-A-198 948.

First catalytic zone: Pd and/or Pt; second catalytic zone: $Sr_{0.8}La_{0.2}MnAl_{11}O_{19-\alpha}$ and third catalytic zone: $Sr_{0.8}La_{0.2}MnAl_{11}O_{19-\alpha}$; for example, as described in Japanese Patent Application JP-A-04/197 443.

First catalytic zone: Pd and (Pt or Ag); second catalytic zone: Pd and (Pt or Ag); and third catalytic zone: perovskite $ABO_3$ or metal oxide from group V (Nb or V), group VI (Cr) or group VIII (Fe, Co, Ni); for example, as described in international patent applications WO-A-92/9848 and WO-A-92/9849.

Furthermore, it is known that as regards motor vehicles that are powered by natural gas, natural gas is a promising fuel that responds to the growing concerns regarding environmental protection. It is a fuel that is used today by more than one million vehicles in the world (270,000 in Italy, 250,000 in Russia, 150,000 in Argentina, 50,000 in New Zealand, 40,000 in the United States, and 40,000 in Canada). Private and commercial vehicles run on gasoline or natural gas bicarburation. Vehicles with diesel engines (in particular buses) have been adapted to run on natural gas. Limited development of these types of vehicles is planned in several European countries (the Netherlands, Denmark, Switzerland, Belgium) and more energetically in Canada, the United States, and Australia. Methane represents on the order of 5 to 10% (about 100–200 ppmC) of emissions from gasoline-powered vehicle hydrocarbons. This proportion increases to 10–20% after passage over a catalyst because the methane is less well eliminated than the other hydrocarbons. It represents more than 95% of the hydrocarbons (about 1500 ppmC, or 5 to 10 times more than the emissions of gasoline engines) that are contained in the exhaust gases of vehicles with regulated richness that run on natural gas. Thus, for the standardized 13-mode European cycle of a bus engine that runs on natural gas in a lean mixture, several measurements of the composition of the exhaust gases by gas chromatography on line show that the latter does not vary significantly either as a function of richness or as a function of load and conditions (see Tables A and B below).

TABLE A

Influence of richness on the composition for the full-load point of 1260 rpm 1000 m.N

| Lacq. Gas | methane | ethane | ethyl- ene | pro- pane | prop- ylene | isobu- tane | acety- lene | bu- tane |
|---|---|---|---|---|---|---|---|---|
|  | 97.4 | 1.87 | — | 0.11 | — | — | — | 0.21 |
| R = 0.66 | 97.23 | 1.88 | 0.69 | 0.09 | 0.02 | 0.02 | 0.04 | 0.03 |
| R = 0.60 | 97.43 | 2.02 | 0.33 | 0.1 | 0.01 | 0.03 | 0.08 | 0.00 |
| R = 0.58 | 96.28 | 2.51 | 0.99 | 0.09 | 0.02 | 0.04 | 0.06 | 0.00 |

TABLE B

Comparison of the composition at iso-richness 0.60 for two points with low load, 1260 rpm 100 m.N and 2100 rpm 90 m.N

| | meth- ane | eth- ane | ethyl- ene | pro- pane | pro- pyl- ene | iso- bu- tane | acet- ylene | bu- tane |
|---|---|---|---|---|---|---|---|---|
| 1260 rpm | 96.51 | 2.29 | 0.93 | 0.09 | 0.02 | 0.02 | 0.08 | 0.04 |
| 2100 rpm | 95.46 | 3.08 | 1.19 | 0.09 | 0.03 | 0.06 | 0.07 | 0.0 |

Furthermore, the temperatures of the exhaust gases that come from this engine that runs on natural gas are relatively low (from 350° C. to 530° C.). The development of various types of vehicles that run on natural gas coupled with their high methane emissions should produce an increase in methane release. It is therefore imperative to develop dedicated formulations in the treatment of these exhaust gases.

Despite the many improvements already made, it remains important to seek catalysts that have increased activity and stability particularly at low temperature in the range of catalytic combustion and in the field of abating the pollution produced by the exhaust gases from motor vehicles that are powered by natural gas. Actually, in catalytic combustion, the proposed solutions such as formulations with a hexaaluminate base doped with a precious metal or the use of different formulations in a reactor with several catalytic stages do not resolve the problem of stability of the active phase at low temperature that is also responsible for the degradation of performance levels. Likewise, the problem posed by the stability of the catalysts used for abating the pollution produced by the exhaust gases of motor vehicles that are powered by natural gas and operate between 300 and 600° C. has not been resolved. Among the factors believed responsible for this degradation of low-temperature performance levels, the sintering and/or the poisoning of the metallic phase as well as the modification of the oxidation state of active phase are among those most commonly cited.

Furthermore, according to European Patent EP-B-27069, catalysts are known for the treatment of internal combustion engine exhaust gases which comprise iron and cerium that are combined with metals from the platinum group that are deposited on a refractory inorganic oxide.

The research done by the applicant firm has led it to discover that, surprisingly enough, catalysts that contain both cerium, zirconium, iron and precious metals, while eliminating the drawbacks presented by the catalysts of prior art, appear to exhibit excellent activity as well as remarkable stability over time.

This invention therefore proposes a non-selective oxidation catalyst that is characterized in that it comprises a monolithic substrate, a porous support with a refractory inorganic oxide base and an active phase that consists of cerium, zirconium, iron and at least one metal that is selected from the group that is formed by palladium and platinum, with the content of porous support being between 200 and 400 g per liter of catalyst; with the cerium content being between 0.3% and 20% by weight relative to the porous support; with the zirconium content being between 0.3% and 20% by weight relative to the porous support; with the iron content being between 0.01 and 3.5% of iron by weight relative to the porous support; and with the palladium and/or platinum content being between 3 and 20 g per liter of catalyst.

According to preferred characteristics of the catalyst of this invention, the porous support content is between 200 and 350 g per liter of catalyst; the cerium content is between 2 and 15% by weight relative to the porous support; the zirconium content is between 2 and 15% by weight relative to the porous support, the iron content is between 0.1 to 2% by weight relative to the support; and the palladium and/or platinum content is between 5 and 20 g per liter of catalyst.

The content of porous support of the catalyst according to the invention preferably varies between 200 and 400 g per liter of catalyst and even more preferably between 200 and 350 g/l. If the porous support content is less than 200 g, the catalytic activity is not enough to meet the requirements of a combustion process or abating the pollution produced by the exhaust gases of vehicles that run on natural gas. Conversely, a porous support content that is greater than 400 g/l is also harmful to catalytic activity because it causes clogging of the channels of the monolith.

In the catalysts of the invention, the monolithic substrate can consist of a monolith with a ceramic or metallic cellular structure (coil, stack of metal strips or else joining of metallic fibers or metallic wires in the form of a monolith with a fibrous structure). The ceramic used can be mullite, cordierite, α-alumina, zirconia, aluminum titanate, silicon carbide, silicon nitride, or mixtures thereof.

The metal alloys that are used should preferably exhibit refractory properties. They can consist of, for example, compounds of iron, chromium, aluminum and cerium or yttrium, such as Gilphal 135® steel from the Imphy company. The metallic substrate can be previously subjected to oxidizing treatment at a temperature of between 700° C. and 1200° C., preferably between 800 and 1000° C. The cellular structure can be hexagonal, tetragonal, triangular, or undulating; it should allow the gases to pass in the pipes that are formed during their production by extrusion, lamination, and solidification of elements in the shape of sheets. The cell density, i.e., the number of cells per monolith section, is generally between 50 and 600 cells per square inch (7.75 to 93 cells per cm$^2$).

The catalysts according to the invention provide particularly improved performance levels in the processes of catalytic combustion of hydrocarbons, carbon monoxide, hydrogen or mixtures thereof and of abating the pollution produced by the exhaust gases from vehicles that run on natural gas. They can also be used, however, in all catalytic oxidation processes that operate at high temperatures.

The preparation and shaping of the support can constitute the first stage of the preparation of these catalysts. The support with a refractory oxide base that is used according to the invention is generally selected from the group that is formed by the refractory oxides of the metals of groups IIa, IIIa, IVa, and IVb of the periodic table and mixtures thereof in all proportions.

Most often, aluminum oxide of general formula $Al_2O_3 \cdot nH_2O$ is used. Its specific surface area is between 10 and 500 m$^2$/g. This oxide in which n is between 0 and 0.6 is conventionally obtained by controlled dehydration of hydroxides in which $1 \leq n \leq 3$. These hydroxides are themselves prepared by precipitation of aluminum salts by bases or acids in an aqueous medium. The conditions of precipitation and curing determine several forms of hydroxides, the most common of which are boehmite (n=1), gibbsite and bayerite (n=3). Depending on the hydrothermal treatment conditions, these hydroxides provide several transition oxides or aluminas. The alpha, delta, eta, gamma, kappa, khi, rho and theta forms are thus cited. The latter differ primarily by the organization of their crystalline structures. During heat treatment, these various forms are able to develop between one another, according to a complex relationship which depends on the operating conditions of the treatment. The alpha form which exhibits a very low specific surface area is stable at the highest temperature. It is preferred to use aluminas that exhibit a specific surface area between 20 and 250 m$^2$/g and in particular alumina gamma and/or delta.

To increase the thermal stability of this oxide or these oxides, various compounds can be incorporated in the porous support, either directly in the form of pigments or in the form of oxide precursor compounds. Rare earths, alkaline-earth metals and silica, which are among the highest-performing stabilizers of alumina, can be advantageously incorporated into the porous support The silica is particularly preferred, at a content of between 1% and 6% by weight of silica relative to the porous support.

In general, these supports that are used according to this invention can have advantageously been treated, as is well known to one skilled in the art, by pore-forming agents such as those based on cellulose, naphthalene, natural gums or synthetic polymers, to impart to them properties of desired porosity.

The metal content of the group that consists of platinum and palladium of the catalyst according to the invention is at least 3 g per liter of catalyst and preferably between 5 and 20 g/l. If the precious metal content is less than 3 g, the catalytic activity is not high enough to meet the requirements of a combustion process. However, when the precious metal content exceeds 20 g, a further increase in the precious metal content does not make it possible to increase catalytic activity significantly. Contents of more than 20 g of precious metal per liter of catalyst are not ruled out, however. According to the invention, palladium is preferred. Platinum, however, can be advantageously used for a combustion stage that operates at relatively low temperatures, for example at about 500° C. or in combination with palladium.

The presence of cerium and zirconium that are deposited simultaneously on the refractory inorganic oxide or oxides makes it possible to reinforce the activity and the stability of the catalyst over time. Iron can also enhance this effect of synergy.

The cerium content of the catalysts of this invention is between 0.3 and 20% by weight relative to the support, and preferably between 2 and 15% by weight relative to the porous support. If the cerium content is less than 0.3%, the latter does not promise satisfactory catalytic activity. Conversely, when the cerium content exceeds 20% by weight relative to the porous support, a further increase in the cerium content does not make it possible to increase the catalytic activity significantly.

The zirconium content of the catalysts of this invention is between 0.3 and 20% by weight of porous support, and preferably between 2 and 15% by weight relative to a porous support. When the zirconium content is less than 0.3%, its effect on catalytic activity is insignificant. However, when the zirconium content reaches 20% by weight relative to the porous support, a further increase of the zirconium content does not make it possible to increase catalytic activity significantly.

The iron content of the catalysts according to the invention is between 0.01 and 3.5% by weight relative to the support and more particularly between 0.1 and 2%. If the iron content exceeds 3.5%, the iron can then greatly accelerate the drop in specific surface area of the porous support with an alumina base.

The preparation of these catalysts that are deposited on a substrate consists of a coating stage during which the substrate is immersed in a suspension that contains the precursors of the components of the catalyst, then is dried and calcined after excess suspension is evacuated. A second so-called impregnation stage makes it possible to deposit the active metals. For this purpose, the coated substrate is brought into contact with one or more solutions of the precursors of the active metals. After having been optionally drained, the thus coated and impregnated substrate is dried and subjected to heat treatment.

The deposition of cerium, zirconium and iron on the catalyst support of this invention can be done according to any of the techniques that are known to one skilled in the art and can occur at any time during the preparation of the catalyst. They can be introduced in the form of solid compounds (oxides, hydroxides, carbonates, hydroxycarbonates or else insoluble salts) or soluble compounds (nitrates, sulfates, chlorides, alcoholates) into the coating suspension and/or pre-impregnated on one of the components of the coating suspension and/or deposited on the porous support before the impregnation of metals and/or co-impregnated with the metals according to the technique being considered. In the case where cerium, zirconium and iron are deposited after the shaping of aluminas that optionally contain other metals, the methods that are used can be, for example, dry impregnation, impregnation by excess solution, or ion exchange. on an already shaped support, a preferred method of introduction of this additional element is impregnation in an aqueous medium by using excess solution. To eliminate the impregnation solvent, this impregnation is followed by drying and calcination under air at a temperature of between 300 and 900° C.

According to a particular implementation, the support is successively impregnated with a solution that contains compounds that contain cerium, zirconium and iron, then with one or more solutions that contain compounds of the precious metals that are desired to be introduced.

As compounds of cerium, zirconium and iron that can be used, particularly the salts of cerium, zirconium and iron, and more particularly cerous nitrate, cerous acetate, cerous chloride and ammoniacal ceric nitrate, zirconyl nitrate and zirconium tetrachloride, ferric nitrate, ammoniacal iron citrate and ferric chloride Will be cited.

The precursors of the metals of the group that is formed by platinum and palladium are those that are conventionally used for the preparation of catalysts, in particular chlorides, chlorinated complexes, nitrates, amino complexes, and acetylacetonates, As examples, chloroplatinic acid, palladium chloride, tetraamine platinum chloride, dinitrodiaminoplatinum, and palladium nitrate can be cited.

The depth of impregnation can be advantageously regulated by using methods that are known to one skilled in the art and in particular by adding a certain amount of mineral or organic acid to the solution of precious metals. Nitric, hydrochloric, and hydrofluoric acids or acetic, citric, and oxalic acids are commonly used.

The catalysts according to the invention provide especially improved performance levels in the processes of catalytic combustion of hydrocarbons such as methane, carbon monoxide, hydrogen or mixtures thereof and in the processes of abating the pollution that is produced by the exhaust gases from the vehicles that run on natural gas. They can also be used, however, in all of the catalytic processes that require high temperatures.

Furthermore, catalytic combustion reactors can comprise one or more catalytic stages whose formulations can be different. The catalysts of this invention can be used in one-stage or in several-stage catalytic reactors. In the latter case, they are preferably used in the catalytic stage(s) which operate(s) at temperatures that are lower than 1100° C.

The following examples illustrate the invention without, however, limiting it:

The various precursors that are used are commercial products of PROLABO®. The elementary compositions of the catalysts were determined by fluorescence X (PHILIPS PW 1480®)

EXAMPLE 1

Preparation or Catalysts C1 to C5 According to the Invention

Cerium, zirconium, and iron are deposited on the alumina-gamma by impregnation of 700 g of alumina by an aqueous solution of cerous nitrate, zirconyl nitrate and ferric nitrate. This solution contains the equivalent of 51.5 g of cerium oxide ($CeO_2$), 43 g of zirconium oxide ($ZrO_2$), and 6.5 g of iron oxide ($Fe_2O_3$)

A coating suspension is prepared from two liters of deionized water that is diluted with the equivalent of 12 g of nitric acid, 600 g of gamma type alumina previously impregnated with cerium, zirconium, and iron, and 140 g of boehmite with 72% dry material. This suspension is ground so that the size of the particles is less than 10 microns.

In a first so-called coating stage, a cordierite monolith of 0.84 liter that has 62 cells per cm² (400 cells per square inch) is immersed in the suspension and then drained before excess suspension is eliminated by blowing. Next, the support is dried and then calcined in a furnace whose temperature is kept at 600° C. for two hours. These stages of immersion, blowing, and calcination are repeated a second time, or even a third time to deposit the equivalent of 200 g of porous support per liter of catalyst (substrate).

In a second so-called impregnation stage, the coated monolith is immersed in a palladium nitrate solution so that the amount of palladium that is set after drying and calcination at 500° C. for two hours is 3% by weight of palladium relative to the porous support or, expressed relative to the volume of catalyst: 6 g of palladium per liter of catalyst.

This catalyst C1 that is thus prepared contains by weight, relative to the porous support, 6% cerium, 4.55% zirconium and 0.5% iron and 3% palladium.

Then, four ceramic monoliths of 0.84 liter are coated with this suspension, according to the process described above, to deposit respectively 250 g, 300 g, 350 g, and 400 g of porous support per liter of catalyst (substrate).

These four monoliths are then impregnated with the same palladium content relative to the substrate or 6 g of palladium per liter of catalyst, respectively corresponding to 2.4%, 2%, 1.71% and 1.5% by weight of palladium relative to the porous support.

The catalysts that are thus prepared are numbered respectively C2, C3, C4, and C5.

EXAMPLE 2

Preparation of Catalyats C6 and C7 (Comparison)

To show the effect of a reduction in the content of porous support with the same metal content on the stability of the catalytic activity of a formulation, two cordierite monoliths of 0.84 liter are coated with a suspension that is prepared as described in Example 1, to deposit respectively 100 g and 150 g of porous support per liter of catalyst (substrate).

Each of these two monoliths is then impregnated with a palladium solution to deposit 6 q of palladium relative to one liter of catalyst.

Catalyst C6 that is thus prepared contains by weight, relative to the porous support, 6% cerium, 4.55% zirconium and 0.5% iron, and 6% palladium. Catalyst C7 that is thus prepared contains by weight, relative to the porous support, 6% cerium, 4.55% zirconium and 0.5% iron and 4% palladium.

EXAMPLE 3

Catalytic Activity of Catalysts C1 to C7

In the prepared catalysts (references C1, C2, C3, C4, C5, C6 and C7), cylinders are cut that are 1.5 cm in diameter and 5 cm in length in the longitudinal direction of the channels.

The tests are carried out in a laboratory reactor that comprises a pipe into which the catalyst is introduced. This pipe is placed in the center of a cylindrical furnace that can be brought to a temperature of 1500° C. An air-methane mixture at 3.5% methane by volume is prepared with mass flow regulators and sent to the intake of the reactor. The hourly flow rate of the gases is 50,000 times greater than the volume of the substrate (VVH=50,000 h$^{-1}$). The concentration of methane at the intake and at the outlet of the reactor is determined with a flame ionization detector (analyst JUM ENGINEERING model FID 3-300). The conversion into methane is the ratio in percentage between the difference in methane concentration between the intake and the outlet and the intake concentration.

After a rise in temperature with a reaction mixture at 5° C./min from 250° C. up to 530° C., the intake temperature of the reaction mixture is set at this temperature. The conversion of methane after 50 hours of operation under stabilized conditions is determined. This period makes it possible to distinguish in a significant way the formulations as a function of their ability to stabilize the combination of the methane.

Table 1 summarizes the elementary compositions of catalysts C1 to C7 and the conversions that are obtained after 50 hours of operation under established conditions.

TABLE 1

Elementary compostions of catalysts C1 and C7 and conversions of these catalysts that are obtained after 50 hours of operation under established conditions.

| Reference of the catalyst | Porous support content (g/l) | Ce content (%) | Zr content (%) | Fe content (%) | Pd content (in g/l of catalyst) | % of conversion after 50 hours of operation |
|---|---|---|---|---|---|---|
| C1 according to the invention | 200 | 6 | 4.55 | 0.5 | 6 | >98 |
| C2 according to the invention | 250 | 6 | 4.55 | 0.5 | 6 | >98 |
| C3 according to the invention | 300 | 6 | 4.55 | 0.5 | 6 | >98 |
| C4 according to the invention | 350 | 6 | 4.55 | 0.5 | 6 | >95 |
| C5 according to the invention | 400 | 6 | 4.55 | 0.5 | 6 | >90 |
| C6 for comparison | 100 | 6 | 4.55 | 0.5 | 6 | ≈40 |
| C7 for comparison | 150 | 6 | 4.55 | 0.5 | 6 | ≈75 |

Table 1 clearly shows that increasing the alumina content at the same palladium content for the catalyst of this invention significantly improves the stability of the catalytic activity of the catalyst. A content of porous support that is greater than 200 g/l is necessary to reach the performance levels that are required by the catalytic combustion reactors. Too high a content of porous support, i.e., above 400 g/l, however, proves to be harmful due particularly to the clogging of the channels of the monolith during the coating.

EXAMPLE 4

Preparation of Catalysts C8 to C10 According to the Invention

Cerium, zirconium and iron are deposited on the alumina-gamma by impregnating 700 g of alumina with an aqueous solution of cerous nitrate, zirconyl nitrate, and ferric nitrate. This solution contains the equivalent of 51.5 g of cerium oxide ($CeO_2$), 7.8 g of zirconium oxide ($ZrO_2$), and 6.5 g of iron oxide ($Fe_2O_3$)

A coating suspension is prepared from two liters of deionized water that is diluted with the equivalent of 12 g of nitric acid, 600 g of gamma type alumina previously impregnated with cerium, zirconium and iron, and 140 g of boehmite with 72% dry material. This suspension is ground so that the size of the particles is less than 10 microns.

Three cordierite monoliths of 0.84 liter are coated with this alumina suspension, according to the process of Example 1, to deposit 250 g of porous support per liter of catalyst (substrate).

Each monolith is then impregnated separately with a palladium solution to deposit respectively 6%, 4%, and 2% by weight of palladium relative to the impregnated coated layer or, expressed relative to the volume of catalyst: respectively 15 g, 10 g and 5 g of palladium per liter of catalyst.

Catalysts C8, C9 and C10 that are thus prepared contain by weight, relative to the impregnated coated layer, 6% cerium, 1% zirconium, and 0.5% iron and respectively 6% palladium for C8, 4% palladium for C9, and 2% for C10.

EXAMPLE 5

Preparation of Catalysts C11 to C13 (Comparison)

To show the effect of the palladium content on the catalytic activity, two monoliths of 0.84 liter of cordierite are coated with a suspension that is identical to the one used in Example 3, according to the process of Example 1, to deposit 250 g of porous support per liter of catalyst (substrate).

Each monolith is then impregnated separately with a palladium solution to deposit respectively 0.8%, 0.4%, and 0.2% by weight of palladium relative to the impregnated coated layer or, expressed relative to the volume of catalyst: respectively 2 g, 1 g and 0.5 g of palladium per liter of catalyst.

Catalysts C11, C12 and C13 that are prepared in this way contain by weight, relative to the impregnated coated layer, 6% cerium, 1% zirconium, and 0.5% iron and respectively 0.8% palladium for C11, 0.6% palladium for C12, and 0.2% for C13.

EXAMPLE 6

Catalytic Activity of Catalysts C8 to C13

In the prepared catalysts (references C8 to C13), cylinders are cut that are 1.5 cm in diameter and 5 cm in length in the longitudinal direction of the channels.

The procedure for evaluating Example 2 is restated to compare catalysts C8 to C13 that have different palladium contents.

Table 2 summarizes the elementary compositions of catalysts C8 to C13 and the conversions that are obtained after 50 hours of operation under established conditions.

TABLE 2

Elementary Compositions of Catalysts C8 to C13 and Conversions of these Catalysts that are Obtained after 50 hours of Operation under Established Conditions.

| Reference of the catalyst | Porous support content 5 g/1° | Ce content (%) | Zr content (%) | Fe content (%) | Pd content (in g/l of catalyst) | % of conversion after 50 hours of operation |
|---|---|---|---|---|---|---|
| C8 according to the invention | 250 | 6 | 1 | 0.5 | 15 | >98 |
| C9 according to the invention | 250 | 6 | 1 | 0.5 | 10 | >98 |
| C10 according to the invention | 250 | 6 | 1 | 0.5 | 5 | >98 |
| C11 for comparison | 250 | 6 | 1 | 0.5 | 2 | ≈75 |
| C12 for comparison | 250 | 6 | 1' | 0.5 | 1 | ≈40 |
| C13 for comparison | 250 | 6 | 1 | 0.5 | 0.5 | ≈30 |

This Table 2 therefore clearly shows that a content of precious metals that is greater than those commonly used in post-combustion, as used by catalysts C8 to C10 according to the invention, is necessary to meet the strict requirements of a catalytic combustion process. In contrast, catalysts C11 to C13, whose contents of palladium and alumina are representative of automobile post-combustion catalysts, do not maintain sufficient stability of catalytic combustion of methane, an application whose operating conditions are far removed from the operating conditions of post-combustion. Too high a content of precious metals, however, does not significantly improve the catalytic performance levels.

EXAMPLE 7

Preparation of Catalysts C14 to C20 According to the Invention

To evaluate the impact of various dopants of alumina (Si, La, Ba) on the stability of the catalyst according to the invention, four identical alumina suspensions with 30% dry material are prepared. The first is kept just as is; the other three suspensions are diluted, respectively, with a solution of either silicon, lanthanum, or barium so that the atomic ratio (dopant cation/total Al)=0.01.

Four ceramic monoliths of 0.84 l are coated separately with these suspensions, according to the process of Example 1, to deposit 250 g of porous support per liter of catalyst (substrate).

Then, each coated monolith is impregnated with an aqueous solution of cerous nitrate, zirconyl nitrate, and ferric nitrate. This solution contains the equivalent of 21.5 g of cerium oxide ($CeO_2$), 17.9 g of zirconium oxide ($ZrO_2$), and 1.61 g of iron oxide ($Fe_2O_3$). They are then dried at 120° C. and calcined at 500° C. for two hours.

Finally, each of these four monoliths is impregnated with a palladium solution to deposit by weight 2.4% of palladium relative to the coated porous support or, relative to the catalyst: 6 g of palladium per liter of catalyst.

Catalyst C14 that is thus prepared contains by weight relative to the porous support 7% cerium, 5.3% zirconium, 0.5% iron and 2.4% palladium; catalyst C15 that is prepared in this way contains by weight relative to the porous support 7% cerium, 5.3% zirconium, 0.5% iron, 0.55% silicon (or 1.17% $sio_2$) and 2.4% palladium; catalyst C16 that is prepared in this way contains by weight relative to the porous support 7% cerium, 5.3% zirconium, 0.5% iron, 2.7% $La_2O_3$ and 2.4% palladium; and catalyst C17 that is prepared in this way contains by weight relative to the porous support 7% cerium, 5.3% zirconium, 0.5% iron, 2.7% BaO, and 2.4% palladium.

Furthermore, catalysts C18, C19 and C20 that contain a higher content of silica, respectively 2%, 4% and 6%, are prepared in the same way as catalyst C15.

EXAMPLE 8

Thermal stability of Catalysts C14 to C20 According to the Invention

The test of hydrothermal aging is carried out in a laboratory reactor that contains a pipe in which the catalyst is introduced. This pipe is placed within a cylindrical furnace that can be brought to a temperature of 1200° C. An air/1% water vapor mixture is sent to the intake of the reactor. The flow is 11/h/gram of catalyst. The temperature is set at 900° C., measured with a thermocouple, and the treatment time is 4 hours. These operating conditions were selected because they are representative of the operating conditions of a combustion catalyst in a first stage of a catalytic combustion reactor. The surface area of the catalyst was measured after this kind of treatment in accordance with the nature of the dopants. Table 3 summarizes the elementary compositions and the measured surface areas.

TABLE 3

Elementary Compostions of Catalysts of C14 to C20 and Surface Area after Hydrothermal Aging at 900° C. - - - 4 h - - - 1% water

| Reference of the catalyst | Ce content (%) | Zr content (%) | Pc content (%) | Pd content (en g/l of catalyst) | Stabilizing oxide content (% by weight) | Surface area measured after hydrothermal aging ($m^2/g$) |
|---|---|---|---|---|---|---|
| C14 | 7 | 5.30 | 0.5 | 6 | 0 | 140 |
| C15 | 7 | 5.30 | 0.5 | 6 | $SiO_2$ (1.17%) | 154 |
| C16 | 7 | 5.30 | 0.5 | 6 | $La_2O_3$ (2.7%) | 140 |
| C17 | 7 | 5.30 | 0.5 | 6 | BaO (2.7%) | 140 |
| C18 | 7 | 5.30 | 0.5 | 6 | $SiO_2$ (2%) | 161 |
| C19 | 7 | 5.30 | 0.5 | 6 | $SiO_2$ (4%) | 165 |
| C20 | 7 | 5.30 | 0.5 | 6 | $SiO_2$ (6%) | 165 |

Table 3 shows that it can be particularly advantageous to add more silica to improve the resistance to sintering of the support, with the preferred silica content being between 1 and 6%. In contrast, lanthanum oxide and barium oxide, which overall are advantageous dopants for inhibiting the transformation of the alumina occurring around 1000° C.–1200° C.: alumina theta>alumina alpha (cf. the articles by B. Beguin entitled "Stabilization of Aluminas by Addition of Lanthanum" in Appl. Cat. 75, 119–132, (1991) and by D. L. Trimm entitled: "Thermal Stability of Catalysts Supports" in the journal Stud. Surf. Scien. Cata., Vol. 68, 29–51, (1991)) prove less effective than silica.

EXAMPLE 9

Catalytic Activity of catalysts C1 to C7 for Abating the Pollution Produced by the Exhaust Gases from Motor Vehicles that are Powered by Natural Gas In the prepared catalysts (references C1, C2, C3, C4, C5, C6 and C7), cylinders are cut that are 1.5 cm in diameter and 5 cm in length in the longitudinal direction of the channels.

The tests are carried out in a laboratory reactor that contains a pipe into which the catalyst is introduced. This pipe is placed in the center of a cylindrical furnace that can be brought to a temperature of 900° C. An oxygen-nitrogen-methane mixture at 0.15% in volume of methane, 0.30% oxygen, and 99.55% nitrogen is prepared with mass flow regulators and sent to the intake of the reactor, with this methane content being representative of the composition of the exhaust gases of motor vehicles that are powered by natural gas. The hourly flow rate of the gases is 50,000 times greater than the volume of the substrate (VVH=50,000 $h^{-1}$). The concentration of methane at the intake and at the outlet of the reactor is determined with a flame ionization detector (analyst JUM ENGINEERING model FID 3-300). The conversion into methane is the ratio in percent between the difference in methane concentration between the intake and the outlet and the intake concentration.

After a rise in temperature with a reaction mixture at 5° C./min from 250° C. to 530° C., the intake temperature of the reaction mixture is set at this temperature. The conversion of the methane after 50 hours of operation under stabilized conditions is determined. This length of time makes it possible to distinguish in a significant way the catalytic formulations from the standpoint of their stability to convert the methane into carbon dioxide and water.

Table 4 summarizes the elementary compositions of catalysts C1 to C7 and the conversions of methane that are obtained after 50 hours of operation under established conditions.

TABLE 4

Elementary Compostions of Catalysts C1 to C7 and
Conversion of these Catalysts that are Obtained after
50 Hours of Operation under Stabilized Conditions

| Reference of the catalyst | Porous support content (g/l) | Ce content (%) | Zr content (%) | Fe content (%) | Pd content (in g/l of catalyst) | % of conversion after 50 hours of operation |
|---|---|---|---|---|---|---|
| C1 according to the invention | 200 | 6 | 4.55 | 0.5 | 6 | >98 |
| C2 according to the invention | 250 | 6 | 4.55 | 0.5 | 6 | >98 |
| C3 accordihg to the invention | 300 | 6 | 4.55 | 0.5 | 6 | >98 |
| C4 according to the invention | 350 | 6 | 4.55 | 0.5 | 6 | >95 |
| C5 according to the invention | 400 | 6 | 4.55 | 0.5 | 6 | >90 |
| C6 for comparison | 100 | 6 | 4.55 | 0.5 | 6 | ≈30 |
| C7 for comparison | 150 | 6 | 4.55 | 0.5 | 6 | ≈60 |

Table 4 clearly shows that increasing the alumina content with the same palladium content for the catalyst of this invention improves in a significant way the stability of the catalytic activity of the catalyst. A content of porous support that is greater than 200 g/l is necessary to meet the requirements of abating the pollution produced by the exhaust gases of motor vehicles that are powered by natural gas. Too high a content of porous support, i.e., greater than 400 g/l, however, proves to be harmful due particularly to the clogging of the channels of the monolith during coating.

The preceding examples can be repeated with similar success by substituting the generically or specifically described reactants and/or operating conditions of this invention for those used in the preceding examples.

The entire disclosure of all applications, patents and publications, cited above and below, and of corresponding French application 95/15431, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for catalytic combustion of a fuel comprising hydrocarbons, carbon monoxide, hydrogen or mixtures thereof which process comprises combusting the fuel in the presence of a non-selective oxidation catalyst that comprises a monolithic substrate, a porous support comprising a refractory inorganic oxide and an active phase impregnated therein which comprises oxides of cerium, zirconium and iron and at least one metal selected from the group consisting of palladium and platinum, with the porous support content being from greater than 200 to 400 g per liter of catalyst; with the cerium content being between 0.3% and 20% by weight relative to the porous support; with the zirconium content being between 0.3 % and 20% by weight relative to the porous support; with the iron content being between 0.01 and 3.5% by weight relative to the porous support; and with the palladium and/or platinum content being from 3 g to 20 g per liter of catalyst.

2. The process of claim 1, wherein in the catalyst the porous support content is from greater than 200 to 350 g per liter of catalyst; the cerium content is between 2 and 15% by weight relative to the porous support; the zirconium content is between 2 and 15 % by weight relative to the porous support; the iron content is between 0.1 to 2% of iron by weight relative to the porous support; and the palladium and/or platinum content is between 5 and 20 g per liter of catalyst.

3. The process of claim 1, wherein the refractory inorganic oxide is selected from the group consisting of alumina-alpha, alumina-delta, alumina-eta, alumina-gamma, alumina-kappa, alumina-khi, alumina-rho, alumina-theta, silica, silica-aluminas; titanium oxide, zirconium and mixtures thereof.

4. The process of claim 1, wherein in the catalyst said porous support has a specific surface area of between 20 and 250 m$^2$/g.

5. The process of claim 1, wherein the refractory inorganic oxide is selected from the group consisting of alumina-alpha, alumina-delta, alumina-eta, alumina-gamma, alumina-kappa, alumina-khi, alumina-rho and alumina-theta.

6. The process of claim 1, wherein said support has been stabilized thermally by introducing at least one compound that is selected from the group consisting of oxides of trivalent rare earths, oxides of alkaline-earth metals, and silica.

7. The process of claim 6, wherein said support has been stabilized thermally by silica.

8. The process of claim 7, wherein the silica content is 1 and 6% by weight relative to the porous support.

9. The process of claim 1, wherein in the catalyst said substrate is metal or ceramic.

10. The process of claim 1, which comprises multiple catalytic stages of which at least one operates at a temperature lower than 1100° C. and contains said non-selective oxidation catalyst.

11. The process of claim 1, wherein in the catalyst the porous support content is from 250 to 400 g per liter of catalyst.

12. The process of claim 1, wherein in the catalyst the palladium and/or platinum content is from 5 to 15 g per liter of catalyst.

13. The process of claim 1, wherein in the catalyst the palladium and/or platinum content is from 5 to 20 g per liter of catalyst.

14. A process for catalytic combustion of the exhaust gases from the engine of a vehicle fueled by natural gas which process comprises combusting the exhaust gases in the presence of a non-selective oxidation catalyst that comprises a monolithic substrate, a porous support comprising a refractory inorganic oxide and an active phase impregnated therein which comprises oxides of cerium, zirconium and iron and at least one metal selected from the group consisting of palladium and platinum, with the porous support content being from greater than 200 to 400 g per liter of catalyst; with the cerium content being between 0.3 % and 20(% by weight relative to the porous support; with the zirconium content being between 0.3 % and 20% by weight relative to the porous support; with the iron content being between 0.01 and 3.5% by weight relative to the porous support; and with the palladium and/or platinum content being from 3 g to 20 g per liter of catalyst.

15. The process of claim 14, wherein in the catalyst the porous support content is from greater than 200 to 350 g per liter of catalyst; the cerium content is between 2 and 15% by weight relative to the porous support; the zirconium content is between 2 and 15% by weight relative to the porous support; the iron content is between 0.1 to 2% of iron by weight relative to the porous support; and the palladium and/or platinum content is between 5 and 20 g per liter of catalyst.

16. The process of claim 14, wherein the refractory inorganic oxide is selected from the group consisting of alumina-alpha, alumina-delta, alumina-eta, alumina-gamma, alumina-kappa, alumina-khi, alumina-rho, alumina-theta, silica, silica-aluminas; titanium oxide, zirconium and mixtures thereof.

17. The process of claim 14, wherein in the catalyst said porous support has a specific surface area of between 20 and 250 $m^2/g$.

18. The process of claim 14, wherein the refractory inorganic oxide is selected from the group consisting of alumina-alpha, alumina-delta, alumina-eta, alumina-gamma, alumina-kappa, alumina-khi, alumina-rho and alumina-theta.

19. The process of claim 14, wherein said support has been stabilized thermally by introducing at least one compound that is selected from the group consisting of oxides of trivalent rare earths, oxides of alkaline-earth metals, and silica.

20. The process of claim 19, wherein said support has been stabilized thermally by silica.

21. The process of claim 20, wherein the silica content is 1 and 6% by weight relative to the porous support.

22. The process of claim 14, wherein in the catalyst said substrate is metal or ceramic.

23. The process of claim 14, which comprises multiple catalytic stages of which at least one operates at a temperature lower than 1100° C. and contains said non-selective oxidation catalyst.

24. The process of claim 14, wherein in the catalyst the porous support content is from 250 to 400 g per liter of catalyst.

25. The process of claim 14, wherein in the catalyst the palladium and/or platinum content is from 5 to 15 g per liter of catalyst.

26. The process of claim 14, wherein in the catalyst the palladium and/or platinum content is from 5 to 20 g per liter of catalyst.

* * * * *